(12) United States Patent
Grinberg et al.

(10) Patent No.: US 12,175,446 B2
(45) Date of Patent: *Dec. 24, 2024

(54) METHOD AND APPARATUS FOR FACILITATING PAYMENT VIA MOBILE NETWORKS

(71) Applicant: OBEP PAYMENTS, LLC, San Carlos, CA (US)

(72) Inventors: Alexander Grinberg, North Sydney (AU); Michael Kontorovich, North Sydney (AU); Colin Reyburn, North Sydney (AU); Mark Chazan, North Sydney (AU); Mario Delas, Denver, CO (US)

(73) Assignee: OBEP PAYMENTS, LLC, San Carlos, CA (US)

( * ) Notice: Subject to any disclaimer, the term of this patent is extended or adjusted under 35 U.S.C. 154(b) by 344 days.

This patent is subject to a terminal disclaimer.

(21) Appl. No.: 17/556,492

(22) Filed: Dec. 20, 2021

(65) Prior Publication Data

US 2022/0114573 A1 Apr. 14, 2022

Related U.S. Application Data

(63) Continuation of application No. 14/735,065, filed on Jun. 9, 2015, now Pat. No. 11,205,167, which is a
(Continued)

(30) Foreign Application Priority Data

Jan. 25, 2011 (AU) .................... 2011900224

(51) Int. Cl.
*G06Q 20/32* (2012.01)

(52) U.S. Cl.
CPC ....... *G06Q 20/322* (2013.01); *G06Q 20/3223* (2013.01); *G06Q 20/325* (2013.01); *G06Q 20/3276* (2013.01); *G06Q 20/3278* (2013.01)

(58) Field of Classification Search
CPC .................................. G06Q 20/3276
See application file for complete search history.

(56) References Cited

U.S. PATENT DOCUMENTS

| | | | |
|---|---|---|---|
| 6,941,273 B1 * | 9/2005 | Loghmani | G06Q 30/06 709/200 |
| 7,963,441 B2 * | 6/2011 | Emmons | G06Q 30/06 235/383 |

(Continued)

FOREIGN PATENT DOCUMENTS

WO   WO 2004/114168   12/2004

OTHER PUBLICATIONS

U.S. Appl. No. 13/358,431 Office Action mailed Feb. 25, 2013.
(Continued)

*Primary Examiner* — Edward Chang
(74) *Attorney, Agent, or Firm* — Polsinelli LLP

(57) ABSTRACT

A method and apparatus for facilitating payments for transactions, via mobile devices and mobile telecommunications networks, is disclosed. In an embodiment, a product provider is provided with a code, such as a QRcode, which contains or references payment details for purchase of the product. A mobile user of the application scans the code and is connected to their internet banking application. The payment details are transferred to the internet banking application and the mobile user confirms that the transaction should proceed. Payment is made without any secure details being provided to the product provider.

23 Claims, 14 Drawing Sheets

Related U.S. Application Data continuation of application No. 13/975,013, filed on Aug. 23, 2013, now abandoned, which is a continuation of application No. 13/358,431, filed on Jan. 25, 2012, now abandoned.

(56) References Cited

U.S. PATENT DOCUMENTS

| | | |
|---|---|---|
| 8,825,545 B2 | 9/2014 | Grinberg et al. |
| 11,205,167 B2 | 12/2021 | Grinberg et al. |
| 2002/0095360 A1 | 7/2002 | Joao |
| 2005/0003839 A1 | 1/2005 | Tripp |
| 2005/0125301 A1 | 6/2005 | Muni |
| 2006/0206412 A1 | 9/2006 | Van Luchene et al. |
| 2007/0100770 A1 | 5/2007 | Grinberg et al. |
| 2007/0288377 A1 | 12/2007 | Shaked |
| 2009/0254479 A1 | 10/2009 | Pharris |
| 2011/0004528 A1 | 1/2011 | Donohue et al. |
| 2012/0215690 A1 | 8/2012 | Grinberg et al. |
| 2012/0233004 A1 | 9/2012 | Bercaw |
| 2013/0346299 A1 | 12/2013 | Grinberg et al. |

OTHER PUBLICATIONS

U.S. Appl. No. 13/975,013 Office Action mailed Dec. 9, 2014.
U.S. Appl. No. 14/735,065 Office Action mailed Jun. 10, 2021.
U.S. Appl. No. 14/735,065 Final Office Action mailed Oct. 3, 2019.
U.S. Appl. No. 14/735,065 Office Action mailed May 2, 2019.
U.S. Appl. No. 14/735,065 Final Office Action mailed Dec. 26, 2017.
U.S. Appl. No. 14/735,065 Office Action mailed May 2, 2017.

* cited by examiner

METHOD AND APPARATUS FOR FACILITATING PAYMENT VIA MOBILE NETWORKS

CROSS-REFERENCE TO RELATED APPLICATION

The present application is a continuation and claims the priority benefit of U.S. patent application Ser. No. 14/735,065 filed Jun. 9, 2015, now U.S. Pat. No. 11,205,167, which is a continuation and claims the priority benefit of U.S. patent application Ser. No. 13/975,013 filed Aug. 23, 2013, which is a continuation and claims the priority benefit of U.S. patent application Ser. No. 13/358,431 filed Jan. 25, 2012, which claims the benefit of Australian patent application 2011900224 filed Jan. 25, 2011, which are incorporated herein by reference in their entirety.

FIELD OF THE INVENTION

The present invention relates to a method and apparatus for facilitating payments for transactions via telecommunications networks and, particularly, but not exclusively, to a method and apparatus for facilitating payments via mobile devices and mobile telecommunications networks.

BACKGROUND OF THE INVENTION

It is known to "shop" over the Internet. A large volume of products (goods and services) are transacted via the Internet.

Security of information transmitted over networks such as the Internet is an important issue. On-line release of private information, such as credit card numbers, debit card numbers or any other transaction related private information, is a major security issue. The misappropriation of such private information to conduct fraudulent transactions is well known and a major problem.

A number of solutions have been proposed to deal with this problem. The applicant's own earlier patent application, PCT/AU2004/000846, proposes A System and Method for Facilitating On-Line Payment, where a customer does not have to provide private information, such as credit card details, over the Internet to merchants. Instead, the applicant's earlier system provides an interface which automatically connects the customer's computer to the customer's own financial institution banking application (e.g. Internet banking application). A customer then pays for the transaction via the financial institution application. The merchant (eg merchant providing on-line web pages for sale of product) is provided with a receipt. No private transaction information, such as credit card details, needs to be provided to the merchant.

The use of mobile devices for communications, eg mobile telephones (also known as "cellular" telephones) is well known. As these devices and their communications networks have become more sophisticated, they have found use in many other applications apart from voice communications. One of the applications that they have found use in is in payment for transactions, utilising the mobile device. The same issues of security regarding private payment information apply with mobile devices as they do to on-line transactions using other types of communications devices, such as desktop computers.

There is a need for improvements in security and ease of use relating to payment transactions carried out via mobile devices.

SUMMARY OF THE INVENTION

In accordance with a first aspect, the present invention provides a customer apparatus for facilitating payment transactions between a customer and a product provider, the customer apparatus comprising a reader arranged to read a product provider artefact storing transaction data about the transaction, to obtain the transaction data, and a transaction process arranged to connect over a communication network to a financial institution application of a financial institution administering a customer account of the customer, to provide the transaction data to the financial institution application, so that the financial institution can make payment for the transaction from the customer account.

In an embodiment, the transaction process enables provision from the customer apparatus of a security device to the financial institution application. The security device may enable the financial institution application to proceed with the transaction. In an embodiment, the security device may be a password, a biometric, or any other security device.

In an embodiment, the customer apparatus is a mobile device. It may be a mobile telephone, PDA, tablet computer, or any other mobile device which can transmit and receive information over a mobile telecommunications network or other wireless or wired network.

In an embodiment, the mobile device comprises a transceiver for transmitting and receiving information over a mobile communications network. Other embodiments may utilise any other type of wireless or wired network. It also comprises a processor for processing data and applications (eg software in the form of a computer program) and a memory for storing data and programs. Such devices are well known.

In an embodiment, the reader comprises a software module which is arranged to read the transaction data from the product provider artefact. The product provider artefact may be a visible code which is presented by a product provider. The code may be QRcode, barcode, or any other type of visible code. In this embodiment, the reader is arranged to read the code via a hardware interface of the customer apparatus, such as a camera or other mechanism arranged to obtain images.

In another embodiment, the product provider artefact may comprise a memory and a transmitter for transmitting data from the memory, eg via wireless transmission. The artefact may comprise an RFID device, for example, or other type of near field proximity transmitter device.

In an embodiment, the transaction process comprises a software module which is arranged to make a connection between the customer apparatus and the financial institution application and provide the transaction data to the financial institution application, and enable provision of the security device to the financial institution application.

In an embodiment, the reader and transaction processor may comprise a software application loaded onto mobile device hardware.

In an embodiment, the transaction data may comprise payment data. The payment data may comprise a payment amount, to be paid by the customer to a product provider. It may also include details of a product provider account that the financial institution can pay the payment amount into.

In an embodiment, the transaction data may comprise a reference code. In this embodiment, the reference code may be provided to the financial institution from the customer device and then from the financial institution to a transaction administrator system. The transaction administrator system may receive payment data from the product provider, and provides the payment data to the financial institution in response to the financial institution providing the reference data to the transaction administration system.

Where there is a transaction administration system, the transaction administration system may support the reader and transaction process. The reader and transaction process may be a software application(s) supported by the transaction administration system and provided to the customer for loading on to a customer device, such as a customer mobile device.

In an embodiment, the product provider artefact may be associated with a product being provided by the product provider. It may be a code appearing on an actual product at point of sale so that the customer can pay for the product at point of sale using the customer apparatus. It may be a code appearing on a vending machine, so the product can be vended after the customer has paid for the product via their customer apparatus. It may be a code appearing on a computer screen, so that the customer can pay for an on-line transaction via a merchant website, utilising the customer apparatus. In embodiments, this has the advantage that a customer can pay directly from a customer account, using a mobile device, without having to provide any private information to the product provider, such as credit card details or other private information. It also has the advantage of enabling a secure payment to be made even though a user may be using an untrusted or public computer to select products from the merchant website. The product may be any good or services.

In an embodiment, the financial institution application may be an internet application, such as an internet banking application. In an embodiment, the internet banking application may allow access by the customer to their own account details, and enable them to pay directly from their own account, as with conventional internet banking.

In accordance with a second aspect, the present invention provides a transaction administration apparatus, comprising a processing apparatus, and a product provider artefact providing module arranged to provide a product provider artefact including transaction data, to a product provider apparatus, so that the product provider apparatus may provide the transaction data to a customer apparatus in accordance with the first aspect of the invention, so that the customer apparatus can obtain the transaction data for facilitating payment for the transaction.

In an embodiment, the product provider artefact may be any code or data stored in any way that can be transmitted or presented to the customer apparatus.

In an embodiment, the transaction administration apparatus includes a transaction processing module, arranged to receive payment data from a product provider, and to provide the payment data to a financial institution application, so that the financial institution application can deal with payment to the product provider from a customer account.

In an embodiment, the transaction administration apparatus includes a receipt module, arranged, on confirmation from a financial institution application, to provide receipt data to a product provider apparatus, confirming that payment has been made to a product provider account to meet payment for the transaction.

In an embodiment, the transaction administration apparatus comprises a computing apparatus which is programmed with appropriate applications to implement the production of the product provider artefact, handling of transaction data between the financial institution apparatus and the administration apparatus, and handling of payment data between the product provider apparatus and transaction administration apparatus and handling and provision of receipt data to the product provider apparatus.

In accordance with a third aspect, the present invention provides a product provider artefact storing transaction data about a transaction between a customer and a product provider, and being readable by a customer apparatus in accordance with the first aspect of the invention in order for the customer apparatus to obtain the transaction data.

The product provider artefact may, in embodiments, be a code, such as QRcode, or may be a memory and transmitter for transmitting data from the memory, such as an RFID device or other transmitter arrangement.

In accordance with a fourth aspect, the present invention provides a product provider apparatus, comprising a processing apparatus arranged to store a product provider artefact for transmission to a customer apparatus in accordance with the first aspect of the invention.

In accordance with a fifth aspect, the present invention provides a computer program comprising instructions for controlling a computing device to implement a customer apparatus in accordance with the first aspect of the invention.

In an embodiment, the computing device is a mobile communications device, such as a mobile telephone, for example.

In accordance with a sixth aspect, the present invention provides computer readable medium, providing a computer program in accordance with the fourth aspect of the invention.

In accordance with a seventh aspect, the present invention provides a data signal comprising a computer program in accordance with the fourth aspect of the invention.

In accordance with an eighth aspect, the present invention provides a computer program comprising instructions for controlling a computer to implement a transaction administration apparatus in accordance with the second aspect of the invention.

In accordance with a ninth aspect, the present invention provides a computer readable medium, providing a computer program in accordance with the seventh aspect of the invention.

In accordance with a tenth aspect, the present invention provides a data signal, comprising a computer program in accordance with the seventh aspect of the invention.

In accordance with an eleventh aspect, the present invention provides a transaction processing system, comprising a transaction administration apparatus in accordance with the second aspect of the invention and a customer apparatus in accordance with the first aspect of the invention.

In an embodiment, the system further comprises a product provider artefact in accordance with the third aspect of the invention.

In an embodiment, the system further comprises a product provider apparatus in accordance with the fourth aspect of the invention.

In accordance with a twelfth aspect, the present invention provides a system for facilitating transaction processing, comprising a customer apparatus in accordance with the first aspect of the invention and a product provider artefact in accordance with the third aspect of the invention.

In accordance with a thirteenth aspect, the present invention provides a method of facilitating payment transactions between a customer and a product provider, comprising the steps of using a customer apparatus to read a product provider artefact storing transaction data about the transaction, to obtain the transaction data, connecting the customer apparatus over a communication network to a financial institution application of a financial institution and providing the transaction data to the financial institution application, so that the financial institution can make payment for the transaction from the customer account.

In an embodiment, the method includes the step of providing, via the customer apparatus, a security device to the financial institution application to enable the transaction to proceed. The security device may comprise any security device, for example a password or biometric or any other security device.

In an embodiment, the customer apparatus is a mobile device. It may be a mobile telephone, PDA, tablet computer, or any other mobile device which can transmit and receive information over a mobile telecommunications network.

In accordance with a fourteenth aspect, the present invention provides a method for facilitating a payment transaction between a customer and a product provider, the method comprising the steps of a financial institution computing system receiving transaction data about the transaction from a customer apparatus, the customer apparatus having read the transaction data from a product provider artefact storing the transaction data, and making payment for the transaction from a customer account of the customer associated with the customer apparatus.

In an embodiment, the method comprises the step of receiving a security device from the customer apparatus to enable the transaction to proceed. The security device may be a password, biometric or any other security device.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF EMBODIMENTS

Figure 1:
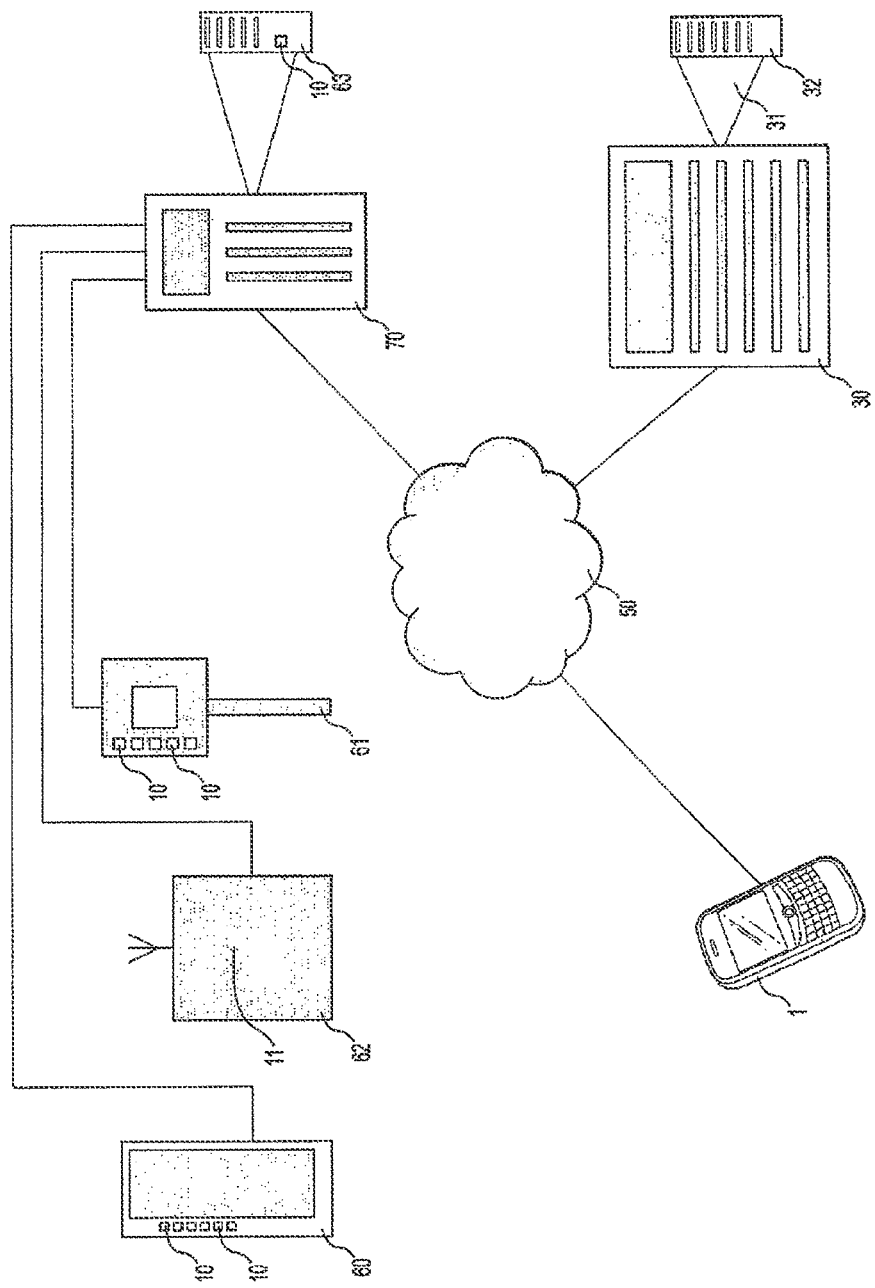
FIG. 1 is a schematic diagram illustrating elements engaged in a transaction facilitating process in accordance with an embodiment of the present invention.

An embodiment of the invention will now be described with reference to FIGS. 1 to 3.

Figure 2:
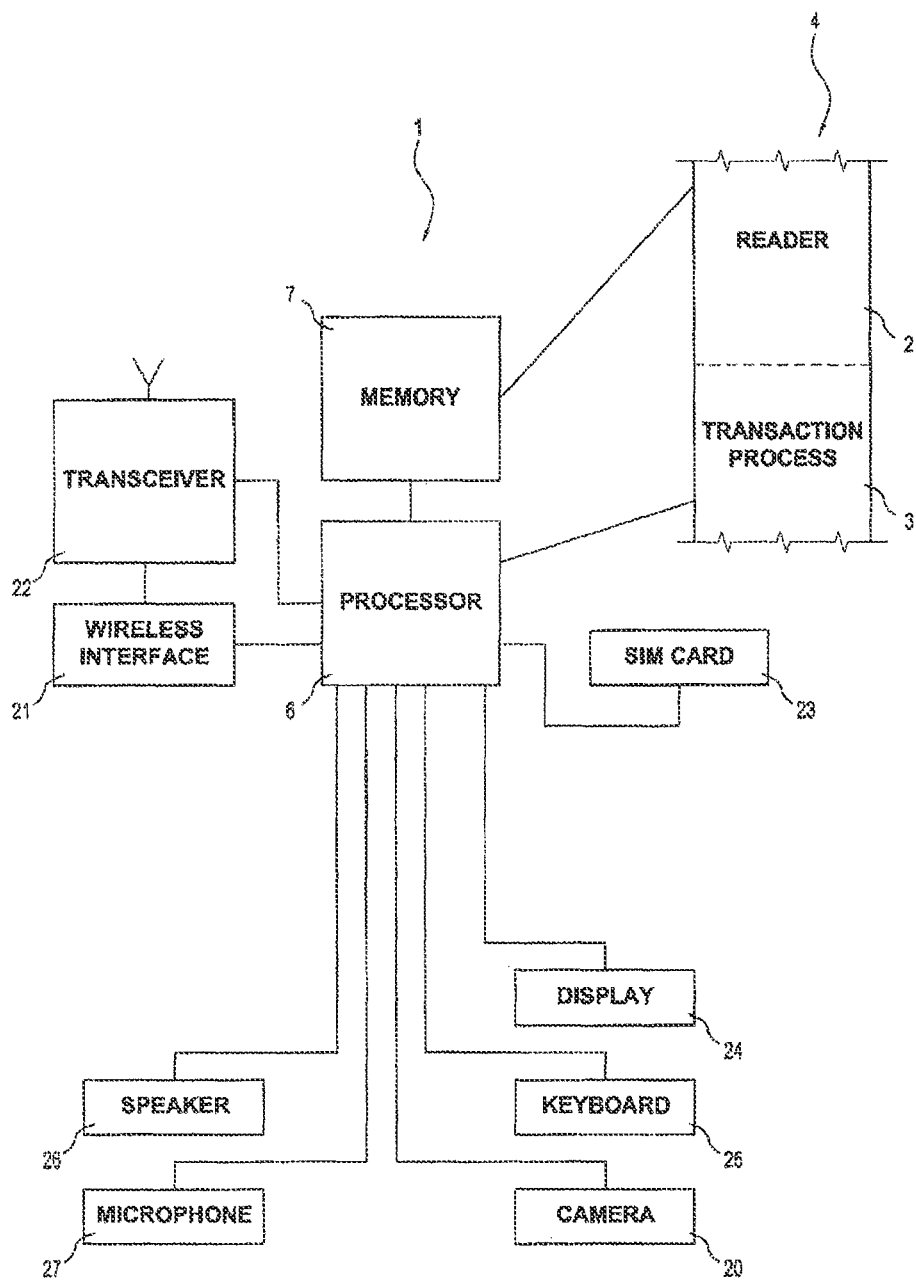
FIG. 2 is a block diagram of a customer apparatus in accordance with an embodiment of the present invention.

FIG. 2 illustrates a customer apparatus, generally designated by reference numeral 1, for facilitating payment transactions between a customer and a product provider. Customer apparatus 1 is also shown in FIG. 1. FIG. 2 is a schematic block diagram of the components of the customer apparatus 1.

The customer apparatus 1 comprises a reader 2 and a transaction process 3. In this embodiment, the reader 2 and transaction process 3 are software modules forming a transaction processing application 4. The reader 2 is arranged to obtain transaction processing data from a product provider artefact. In this embodiment, the product provider artefact may comprise a visible code 10 or transaction data stored in a memory for transmission 11 eg RFID tag, generated, encoded or spoken audio tones, or keyed in manually.

The reader 2 is arranged to read the code or obtain the transaction data from the memory, via an appropriate hardware interface of the customer apparatus 1 (eg camera 20, wireless interface 21, microphone 27, keyboard 25).

The transaction process 3 is arranged to connect the customer apparatus 1 to a financial institution application supported by a financial institution system 30. The financial institution system 30 may be any appropriate computing apparatus and is illustrated in FIG. 1 schematically as being one or more computer server apparatus 30. In this embodiment, the financial institution (FI) system supports the financial institution application 31 which provides web pages 32 for access over the Internet or other telecommunications systems 50 via the customer apparatus 1.

The transaction process connects to the FI application 31 and provides the transaction data to the FI application 31.

In this embodiment the transaction data may include payment information enabling an account of a product provider of a product to be paid by the financial institution system 30. In this embodiment, the financial institution administers an account of a customer associated with the customer apparatus 1. The product provider is paid from the customer account, when the customer authorises payment from the customer apparatus 1. Payment authorisation may be carried out over the connection implemented by the transaction process 3, by providing a security device to the FI application 31. The security device may be a PIN, or other type of password, biometric, digital signature or any other type of security device.

In more detail, the customer apparatus in this example comprises a mobile device 1. The mobile device may be a mobile telephone, PDA, tablet computer, portable computer or any other type of mobile device with a communications facility. Example components for such a device are illustrated in FIG. 2. It will be appreciated that there are many such devices available.

Referring to FIG. 2, the customer mobile device comprises a processor 6 for processing instructions which may be in the form of computer software. It also comprises a memory 7 for storing data and instructions.

Note that the processor 6 may be any type of available processor and the memory 7 may include any type of memory, including ROM and RAM. The memory stores the transaction application 4 which is implemented by the processor 6.

The mobile device 1 also includes a transceiver 22 for sending and receiving voice and data communications over telecommunications network 50. In addition it includes a wireless interface 21 for wireless communications, such as WiFi, Bluetooth, or a wired interface where the device is connected to a computer or network device via a physical connection means.

The device 1 also includes a SIM card 23 display and display drivers 24, keyboard and keyboard drivers 25, speaker 26 and microphone 27.

Note that the layout shown in FIG. 2 is one potential architecture only. A customer apparatus having a functionality described herein may have a different architecture from this and may include additional or different components from that shown in FIG. 2. In addition, although in this embodiment, the reader and transaction process are in the form of a software application 4 loaded onto the device 1, the invention is not limited to this architecture. The application 4 may be either partly or fully in the form of hardware, eg firmware or PGAs or FPGAs, or any other configuration.

The device 1 comprises a mobile device which can be used for conveniently dealing with payment transactions for products provided by product providers, such as merchants.

The customer apparatus 1 in accordance with this embodiment may be used to pay for payment transactions for the purchase of products (any goods or services) provided by a product provider.

The product provider may be any person or entity providing products (which may include any good and/or services) for sale (or hire or any other type of transaction). In this embodiment, each product for sale is associated with a product provider artefact 10, 11 (FIG. 1). The product provider artefact 10, 11 is arranged to provide transaction data to the customer apparatus 1. It may be a visibly readable code, such as QRcode, barcode or any other visible code. It may also be stored in a memory device for transmission to customer apparatus 1 eg by wireless, WiFi, Bluetooth, sound tones or physical connection means. It may be an RFID tag for example, associated with a product. As discussed above, the customer apparatus 1 is arranged to obtain the transaction data and utilise the transaction data to interface with a FI application 31 to pay for the product from a customer account.

The transaction data may be associated in a number of ways with a number of different types of product and product sales channels. FIG. 1 gives some examples:

products sold by way of vending devices 60 may be paid for using this embodiment. QRcode, barcode or other code 10 is associated with each product vended. As the product has been paid for via the device 1 and FI system 30, and payment is acknowledged to a product provider system 70, then the product provider system 70 may instruct the vending device 60 to release the product.

The product provider artefact may be associated with a parking meter 61 for payment for parking services. When the product provider system 70 receives acknowledgement of payment, it may control the parking meter 61 to provide an indication (eg a ticket) that the parking has been paid for.

The product may be associated with an RFID device 62 eg at point of sale. Once the product has been paid for (and acknowledged to system 70) then the product may be released.

The customer apparatus 1 may be used to purchase goods/services which are provided on-line eg via the Internet. A product provider computing apparatus 70 (eg a merchant computer providing an Internet shopping site) may be arranged to serve web pages 63 over the communications network 50, for browsing by customer apparatus 1. Web pages 63 may offer products for sale which the customer may wish to purchase and pay for via their customer apparatus 1. To facilitate payment, the system 70 generates code 10 on one of the web pages which includes the transaction data, to enable the customer apparatus to deal with the transaction. The product may then be provided when the product provider system 70 receives acknowledgement of payment from the FI system 30.

Embodiments of the invention are not limited to transactions for products associated with parking meters, online, vending devices, RFIDs, in store terminals (eg recharging of mobile phone credits), or cash registers. Any product sales channel may be utilised, as long as the transaction data can be provided to the customer apparatus 1.

In this embodiment, the FI application 31 is the usual internet banking application provided by an FI for access by customers having accounts administered by the FI. Such internet banking applications are well known.

The transaction process 3 is arranged to interface with the FI application 31 and fill in the appropriate details of eg product provider account, amount to pay. The customer then controls their apparatus to provide a password or other security device to the financial institution and designate which account they will pay from. This is similar to how standard internet banking applications are operated, but in this case done via a mobile device and using the transaction data provided by the product provider artefact.

In an embodiment, the transaction process may include an agent application which is arranged to automatically access the FI application 31 and fill in the appropriate fields utilising the transaction data. That is, the customer does not have to control the apparatus, eg the apparatus keypad in order to enter the data. It is automatically entered into the FI application 31 by the transaction process.

In an embodiment, the transaction process may also be authorised to automatically enter the security device of the customer. In an alternative embodiment, the customer may be required to manually enter the security device.

Figure 3:
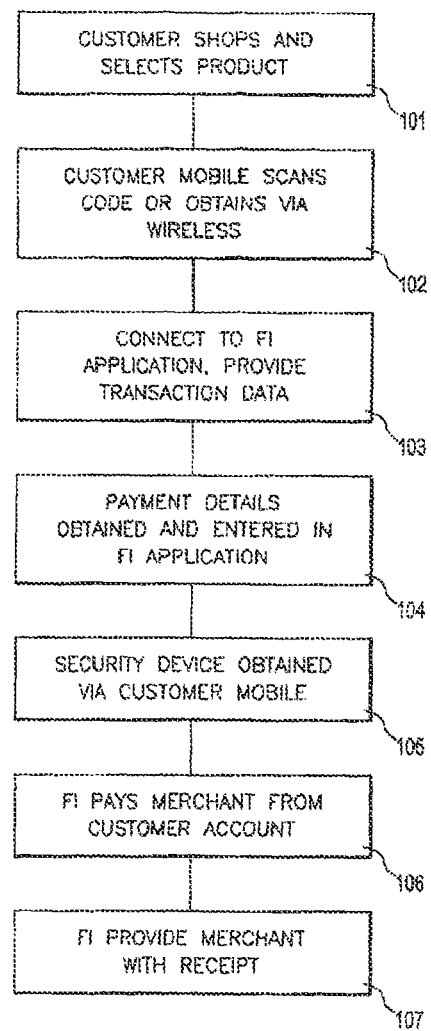
FIG. 3 is a flow diagram illustrating a transaction process implemented via the elements of FIG. 1.

FIG. 3 is a flow diagram illustrating a transaction process in accordance with this embodiment.

At step 101, the customer shops and selects their product. The customer then uses their mobile device 1 to scan the transaction data (if it is a code) or obtain transaction data via wireless connection (if it is stored by RFID or equivalent technology), or by connecting the device directly, or through the input of generated sound tones (102).

The transaction process 3 then causes a connection to the FI application 31 and provides the transaction data to the FI application 31 (103). At 104 payment details are obtained and entered into the FI application. In this embodiment this is done by the payment details being included in the transaction data. The payment details include a payment amount and details of a product provider account, so that the FI system 30 can pay the product provider account. In another embodiment (see later) the transaction data may comprise a reference which is used by the FI system 30 to obtain payment details from elsewhere (see later).

At step 105, a security device, such as a PIN or password, is obtained via the customer mobile device. As discussed above, in some circumstances this may automatically be provided by the transaction process 3.

At step 106, the FI pays the product provider from the customer account. At step 107 the FI provides an acknowledgement or receipt to the product provider system 70.

Figure 4:
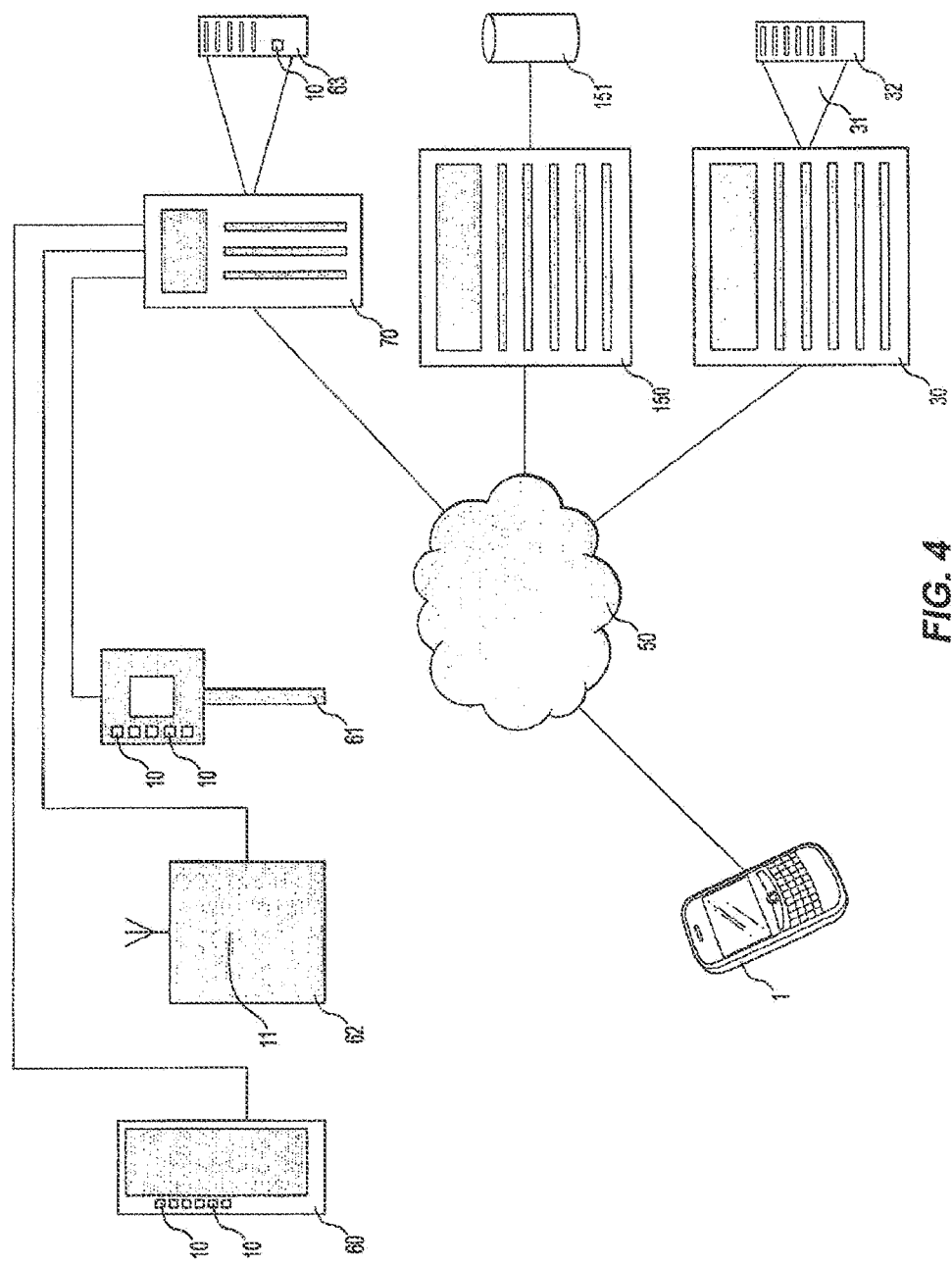
FIG. 4 is a schematic block diagram illustrating elements engaged in a transaction process in accordance with a further embodiment of the present invention.
Figure 5:
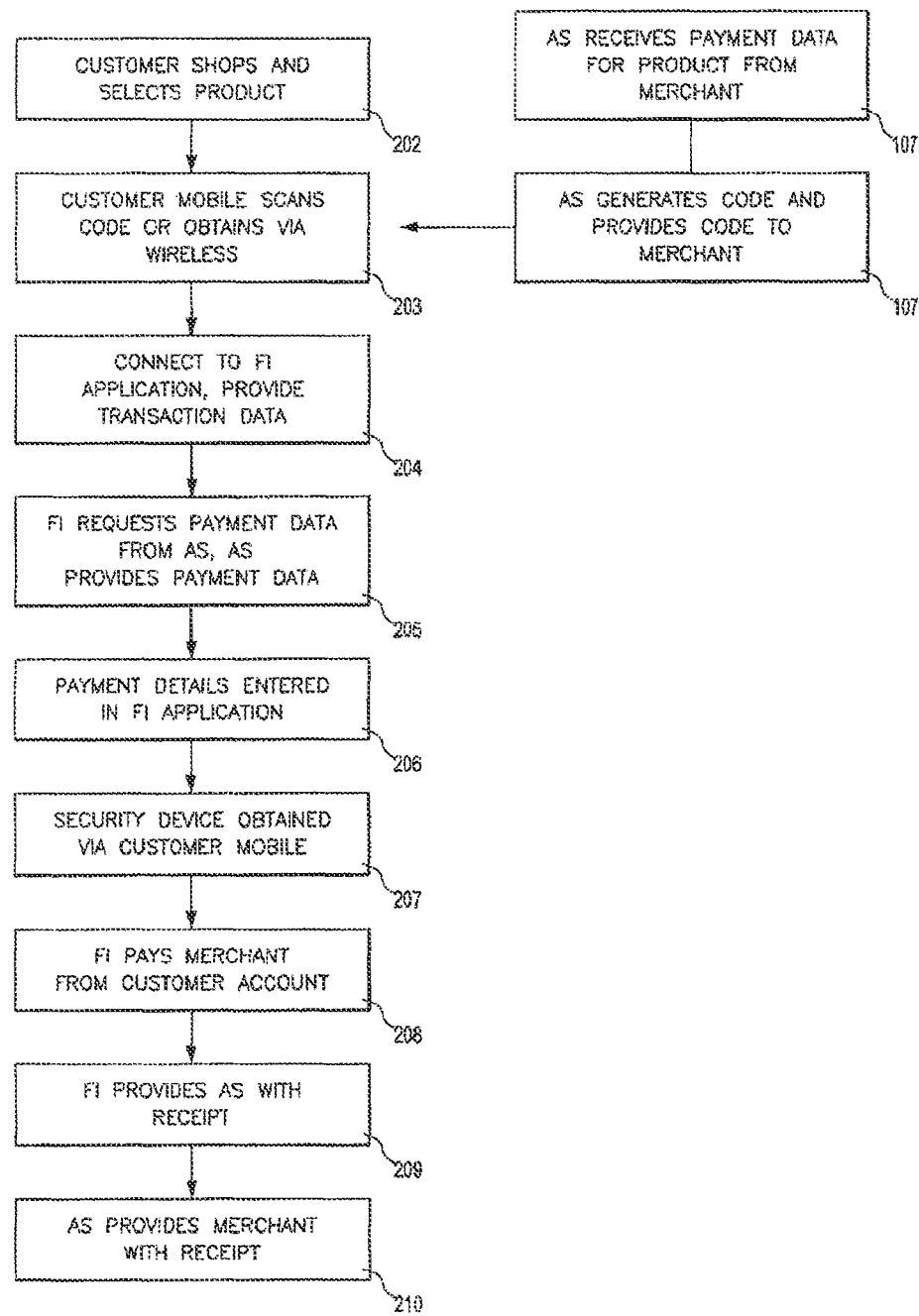
FIG. 5 is a flow diagram illustrating the transaction process in accordance with the further embodiment of the invention.

FIGS. 4 and 5 illustrate a further embodiment of a transaction process which may be implemented in accordance with the present invention. FIG. 4 is a schematic diagram similar to FIG. 2, with the addition of a transaction administration system 150. The transaction administration system 150 allows a transaction administrator to take part in the system, and provide support and control to all transaction processes implemented in accordance with this embodiment. The transaction administration system 150 may be any computing device or system, of any appropriate architecture. In this embodiment it is illustrated as being one or more server systems having the appropriate software and hardware for providing the following functions and for transmitting and receiving data via telecommunications networks 50. The other components of FIG. 4 remain the same as FIG. 1 and use the same reference numerals.

The transaction administration system 150 in this embodiment has a number of functions:

1. To provide support and updates for the transaction processing application 4. The transaction administration system 150 may make the transaction processing application 4 available over communications network 50 for downloading by the customer apparatus 1. It may also provide updates to the transaction processing application 4. It may also make the transaction application 4 available through third party distribution channels eg an "Appstore"

2. The provision and maintenance of transaction data, in the form of codes or data to store in memory of a wireless device such as an RFID. In this embodiment, the transaction system 150 is arranged to receive payment information from a product provider, such as identity of a product, payment amount required and account of the product provider. It takes this payment information and provides a product provider artefact, such as a code or data for use in a wireless memory, and provides it back to the product provider system 70 so that the product provider system can provide it in association with its product(s) (eg via web pages 63, parking meter 61, RFID 62, vending device 60 or in any other way). This enables the system 150 to control the transaction data and product provider and ensure that it is compatible with the transaction processing application on the customer apparatus 1. It also means that the system 150 can act as central coordinator for all transactions, maintaining consistency and quality of the transaction processing as well as the security of product account information. The payment information may be provided before the transaction or in real time during the transaction.

3. The system 150 is arranged to communicate with the FI system 30 to provide payment information so that FI 30 can deal with the payment.

4. The system 150 is arranged to receive acknowledgement that payment has been made from the FI system 30 and provide acknowledgement to product provider system 70 that payment has been made. The system 150 may provide a receipt to product provider system 70.

5. The system 150 also includes a database 151 which stores a record of all transactions. The record can be accessed by customers and also by product providers to obtain records of the transactions made using the process of this embodiment of the invention.

In this embodiment, the actual payment information that is received from the product provider system 70 may include information such as payment amount, account to be paid (eg merchant account). It may also include a product identification, if required. Instead of encoding this information, in one embodiment, the transaction administration system 150 stores the payment information in database 151, and associates it with a reference. For example, the reference may be a number, or number and letters, or any other device. The reference is then encoded (or otherwise provided as a product provider artefact) and provided to the product provider system 70 for use with the associated product. The transaction data which is stored in the code 10 or memory 11 therefore includes a reference and does not include any payment information. This has the advantage that no private information of the product provider (eg account to be paid) is provided to any customer over the network. It is only provided to the trusted transaction administration system 150. All the customer apparatus 1 obtains is a reference. Note that there may be variations from this, and that the code may include a payment amount or other information, for example, but may not include the account to be paid information. This protects the security of the product provider 70.

When the reference is provided by the customer apparatus 1 to the financial institution application 31, the financial institution 30 then contacts the transaction administration system 150 and requests the stored payment information, using the reference. The transaction processing system 150 provides the payment information to the FI system 30, so that the payment can be made.

FIG. 5 is a flow diagram which shows the transaction process of this embodiment.

Steps 200 and 201 illustrate the process for the transaction administration system 150 generating the product provider artefact including the transaction data. At 200, the transaction processing system 150 receives the payment information for a product from the product provider system 70. This may be done as a separate process. For example, when the product provider 70 decides to provide products for sale "on the shelf" they obtain a plurality of codes, one for each of the products, from the transaction administration system 150. Alternatively, the code may be generated at the time a customer wishes to purchase the product. That is a customer may indicate they wish to purchase a product, and then the product provider system 70 requests the transaction administration system 150 for an appropriate code to be provided to the customer.

At step 201, the transaction administration system 150 generates the product provider artefact (code or appropriate transaction data or other artefact). As discussed above, this can be done prior to any transactions, or in "real time" during the transaction.

Whether the product provider artefact is provided by the transaction administration system in real time or in advance will depend upon the circumstances and requirements of the product provider and transaction administrator. Both options may be provided.

A transaction process of this embodiment is as follows.

At step 202, the customer shops and selects their product. At step 203, the customer mobile device 1 scans the code or obtains the transaction data via wireless.

The transaction process 3 then connects to the FI application (204) and provides the transaction data. In this embodiment, the transaction data is in the form of a reference, and does not include private information, such as the account details of the product provider, for example. At step 205, the financial institution system 30 connects with the transaction administration 150 and requests payment data, such as payment amount and account to pay to.

At step 206, these payment details are returned from the administration system to the FI application 31, so FI application may utilise these details for the current transaction. The FI application 31 may be the usual internet banking application provided by the FI. At step 207 the security device is obtained via the customer mobile device 1, either by manual entry of the customer or automatically being provided by the transaction process 3.

The FI system 30 then pays the merchant account from the customer account, step 208. Payment may use existing mechanisms, e.g. "Pay Anyone", "Faster Payments", "ACH" or any other mechanism.

At step 209, the FI system 30 provides a receipt to the transaction administration system 150. The transaction administration system 150 then provides the product provider system 70 with the receipt. The product provider may then release the product. Note that in some embodiments the product may be released at another time. In some cases it may be released before the product provider receives confirmation of payment. The actual transfer of funds may be performed in real time or at a later time eg in an overnight batch bank process.

The transaction processing system 150 also enters details of the transaction in the record 151, so it can subsequently be accessed by the customer and by the merchant.

In the above embodiment, the transaction data is provided by a product provider artefact, which may be in the form of a visible code or transaction data stored in a memory on a wireless device such as an RFID tag. The invention is not limited to these methods of providing the artefact. The transaction data may be provided in other ways.

FIGS. 6A to I are screen shots illustrating how a mobile application in accordance with an embodiment of the present invention may function on a mobile device such as a Smartphone or tablet computer, for example.

Figure 6A:
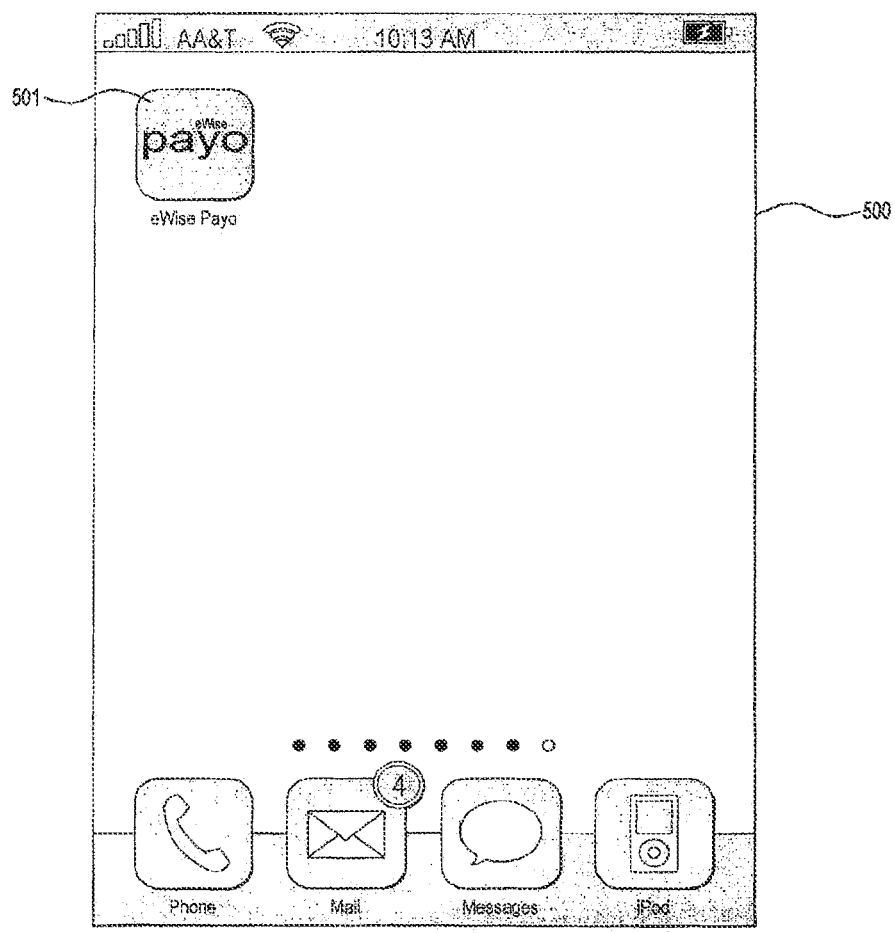
FIGS. 6A through 6I are example screen shots illustrating operation of a customer apparatus in accordance with an embodiment of the present invention.

FIG. 6A shows a "home screen" 500 including "App" icon 501 for a mobile transaction processing application in accordance with an embodiment of the present invention. The icon is activated to activate the application if a customer wishes to make a mobile purchase, for example.

Figure 6B:
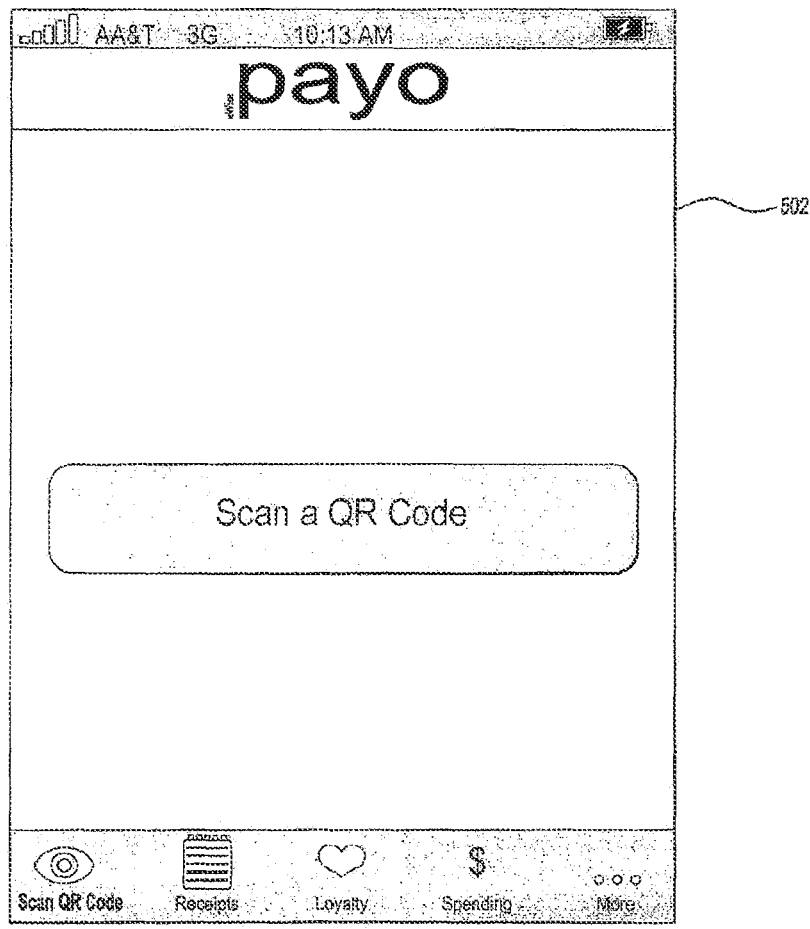

FIG. 6B shows an application screen 503 which indicates to the user that they should use the reader of the device to scan the QRcode to facilitate the transaction.

Figure 6C:
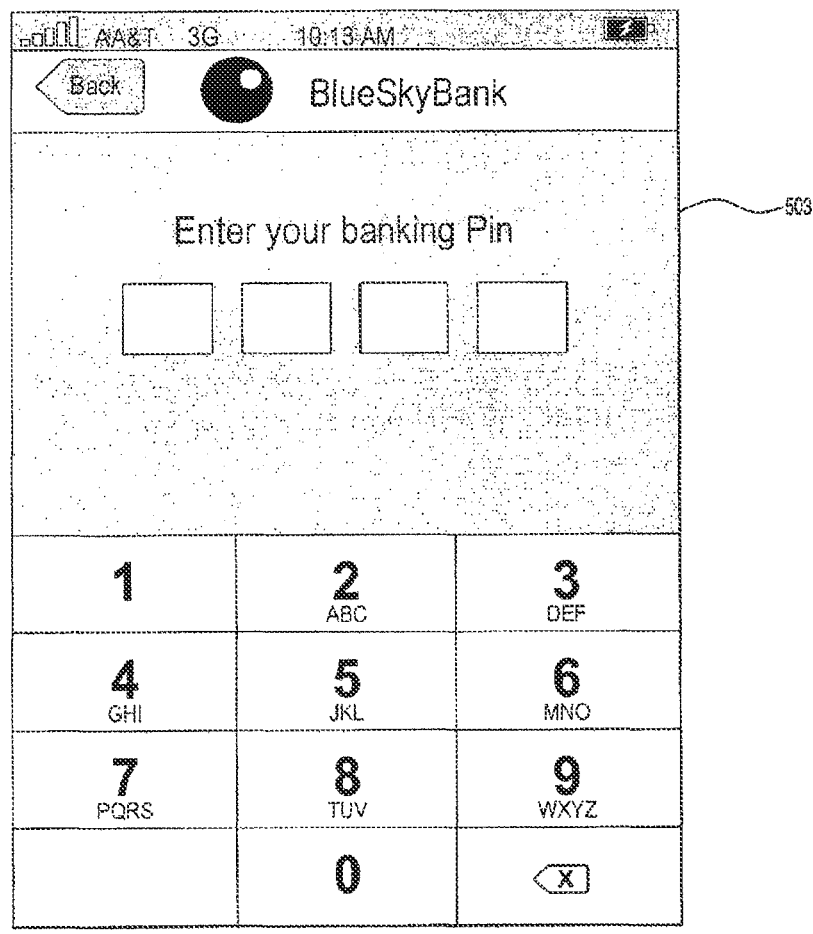
Figure 6D:
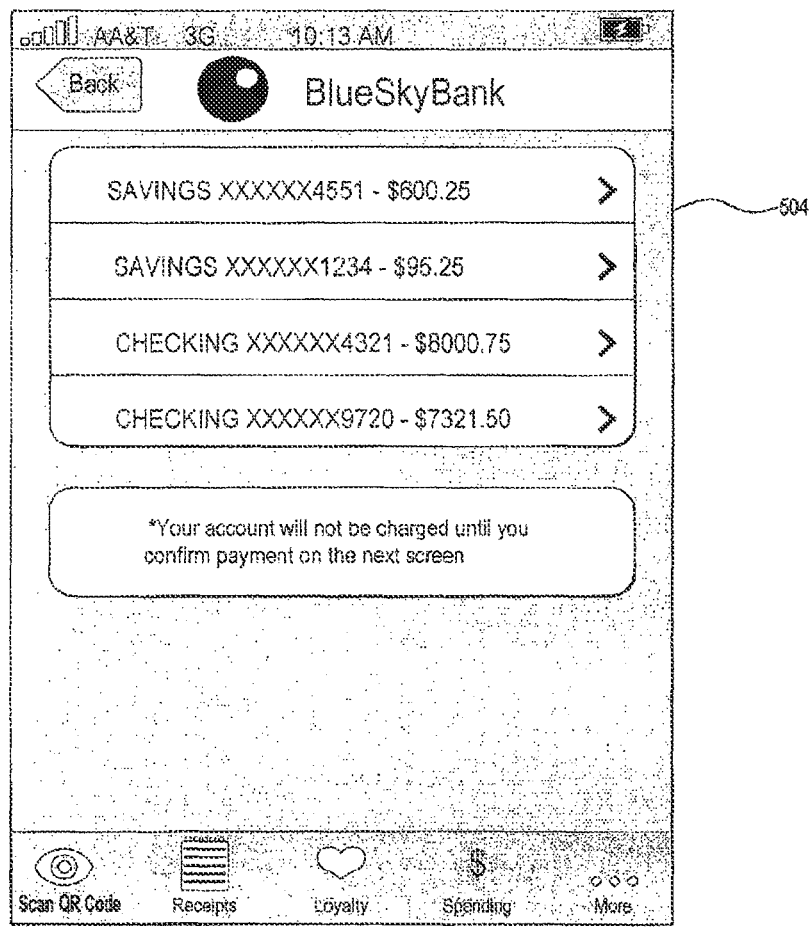

The transaction application connects to the internet banking site of the user and requires the user to enter their PIN code (screen 503, FIG. 6C).

Referring to 6D, screen 504, the user is presented with a selection of their accounts which they may wish to pay for the transaction from.

Figure 6E:
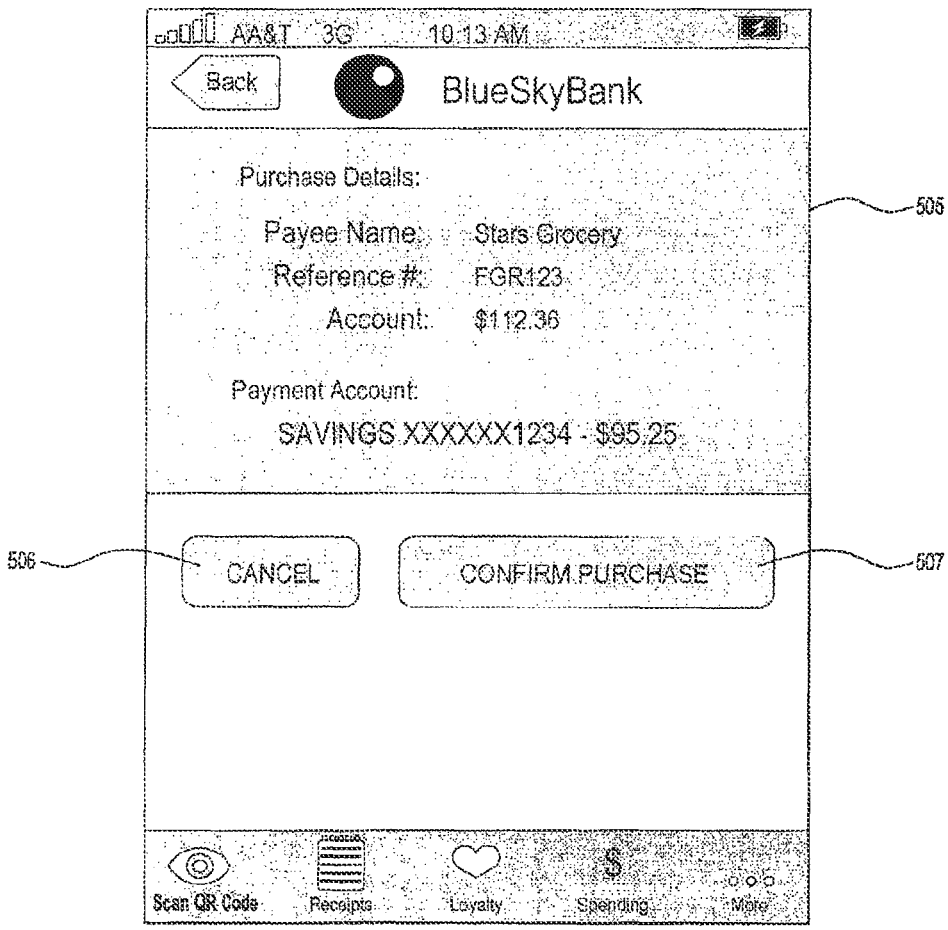

FIG. 6E, screen 505 illustrates the transaction details being presented to the customer. The customer can either cancel 506 or confirm 507 their purchase.

Figure 6F:
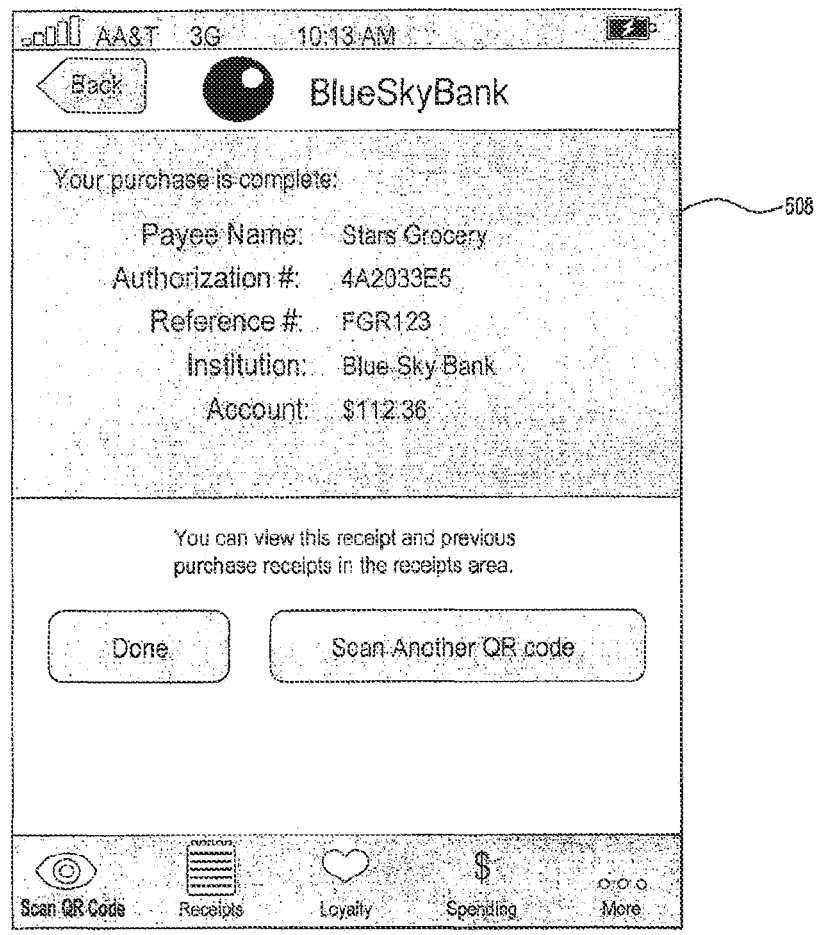

FIG. 6F, screen 508 shows how the transaction receipt details may be presented to the user.

Figure 6G:
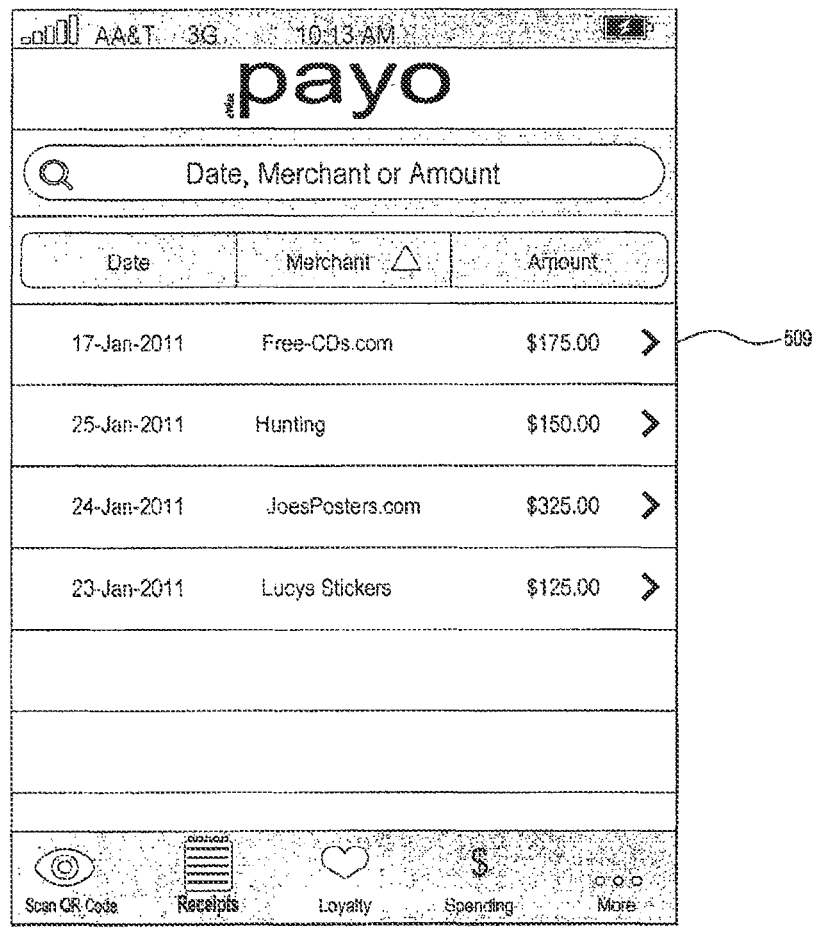

FIG. 6G, screen 509 illustrates how a record of purchases may be presented to the user.

Figure 6H:
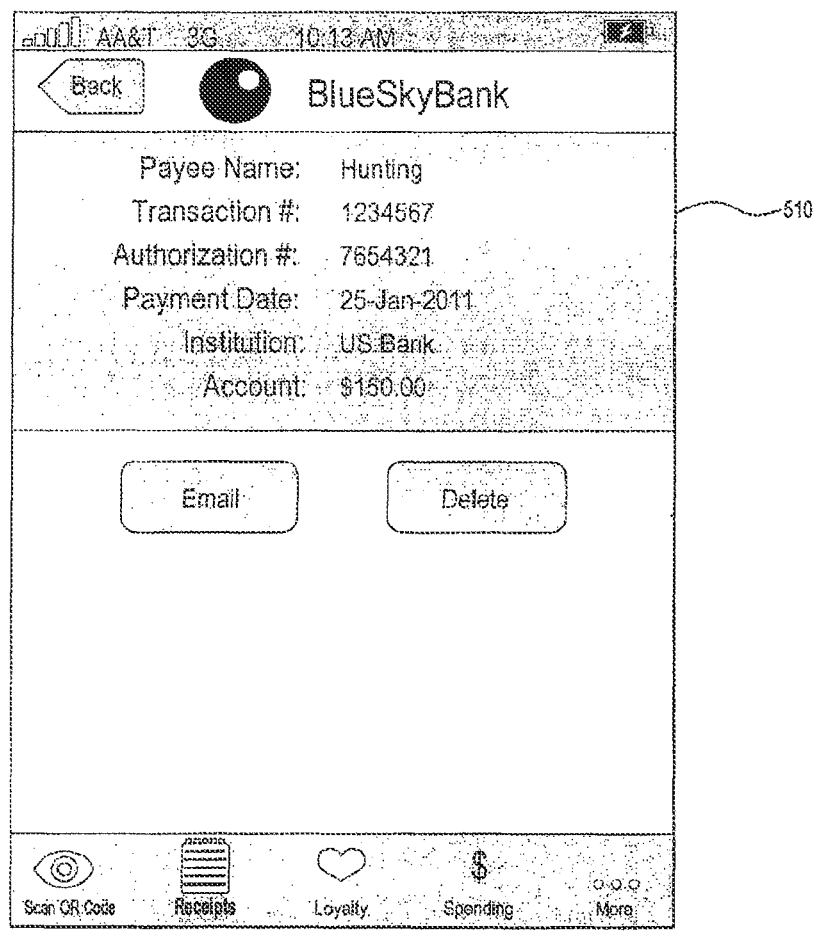

FIG. 6H, screen 510 illustrates transaction details that may be presented to the user if they wish to inquire about the details of transactions that have already taken place.

Figure 6I:
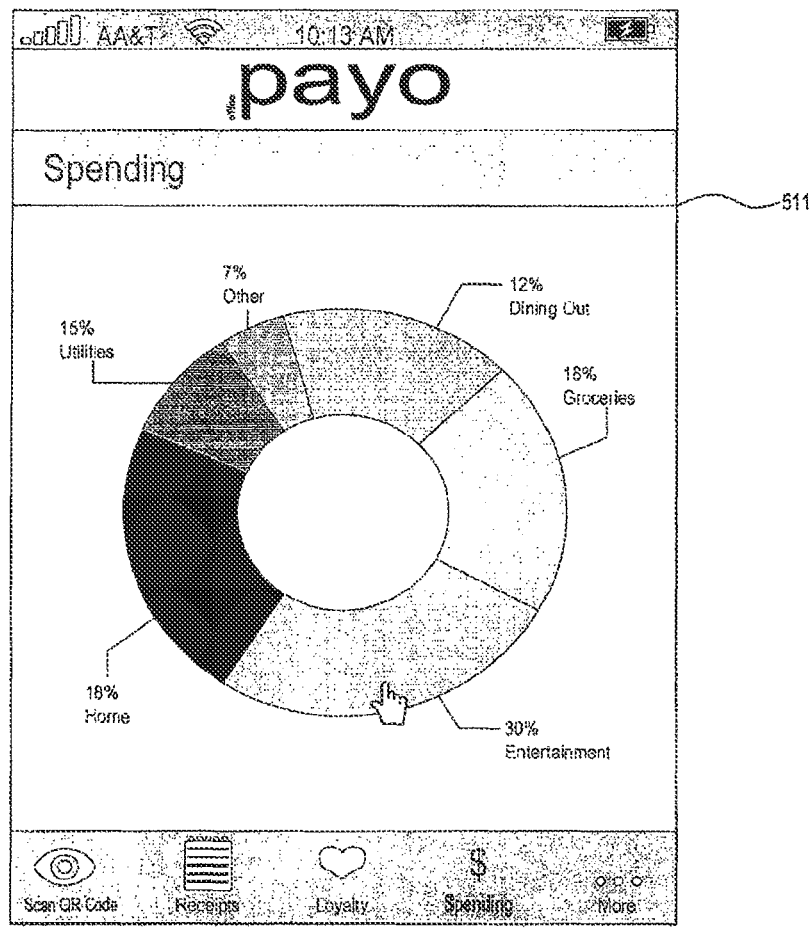

FIG. 6I, screen 511 illustrates a tool which enables a user to view a breakdown of types of purchases that they may have made via the system. Such a breakdown could be used for future budgeting purposes. In this embodiment, the breakdown is shown in percentage terms of various categories such as "Dining Out", "entertainment" and others. It will be appreciated that the calculations may be varied and the breakdown may be shown in otherwise than percentages.

Any names used in the drawings, such as "Payo", it will be appreciated our trademarks only and are not limiting to the present invention.

Another application of an embodiment of the present invention may be to facilitate cash transactions at ATM's. There are a number of problems of ATM's "skimming" people's cards and PINs i.e. someone installs a device onto the ATM that reads the card and takes a video of the user entering their PIN. They later create a fake card with the details and steal money from the victim's account.

In one embodiment, an ATM may be arranged to produce a QRcode or some other code that may be detected by a mobile device configured in accordance with the present invention. The user can scan the code on their mobile device, login into or phone the bank to select an option to dispense cash and then the ATM receives the message telling it to release the cash. This provides an added layer of security to the ATM transaction.

This kind of confirmation that a transaction should proceed, could be used with all types of transaction.

One of the advantages of this invention is that it can use standard already existing financial institution applications, such as standard internet banking applications. These applications in many cases, may not need to be changed, or require relatively minor modifications/enhancements. The current fields of these applications are sufficient to enable payment information to be filled into them, using the processes and apparatus of the present invention.

In the above embodiment, where the transaction administration system 150 communicates with the FI system 30 and the product provider system 70, the transaction administration system 150 may establish secure communications with either one or both of these systems for transport of secure data, such as account details and the like.

Another way in which the code could be provided to a customer could be as an image on a transaction record, such as a bill for payment. It could arrive through the post or via email, and then the customer apparatus would utilise the code to pay for the bill.

In the above embodiment, the customer apparatus 1 is a mobile device. Although this is the preferred embodiment, in other embodiments the customer apparatus may be stationary. For example it may be a PC with a scanner. The scanner could be used particularly for embodiments in reading codes from bills for payment eg electricity bills and the like.

Various parts of embodiments of the invention may be implemented by computer programs, which may be provided as program code. The program code could be supplied in a number of ways, for example on a tangible computer readable storage medium, such as a disk or a memory, or as a data signal (for example combine transmitting it from a server). The program code provides a series of instructions executable by a processor, such as the processor of the customer apparatus 1.

Note that in other embodiments the program may be in the form of hardware, or firmware, such as in the form of FPGAs or PGAs.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be understood to persons skilled in the art of the invention that many modifications may be made without departing from the spirit and scope of the invention.

What is claimed is:

1. A system for secure communication of online data, the system comprising:
    a communication interface that communicates over a communication network, wherein the communication interface:
        receives encoded product data from a client device that read a corresponding encoded artefact, the encoded product data including an encoded reference, and
        communicates with a database that stores a plurality of encoded references each associated with a product provider; and
    one or more processors that execute an agent application stored in memory, wherein the processors execute the agent application to:

identify that the encoded reference matches one of the stored references in the database, wherein the matching stored reference corresponds to an identified product provider;

automatically access of an online webpage associated with an account of the identified product provider; and automatically populate one or more fields associated with the online webpage, wherein the fields are populated based on the encoded product data and stored information regarding the identified product provider without being provided to a system of the identified product provider.

2. The system of claim 1, wherein the communication interface further sends a request for account data to the system associated with the identified product provider based on the matching stored reference.

3. The system of claim 1, wherein the processors execute further instructions to generate the encoded artefact, and wherein the communication interface provides the encoded artefact to the system associated with the identified product provider.

4. The system of claim 1, wherein the encoded artefact includes a visible code, and wherein a reader of the client device reads the encoded product data from the visible code.

5. The system of claim 4, wherein a camera of the client device captures an image of the visible code, and wherein the reader reads the encoded product data from the captured image of the visible code.

6. The system of claim 1, wherein the encoded artefact includes a radio frequency identification (RFID) tag or a near field proximity transmitter device, wherein the client device receives the encoded artefact via a wireless connection with the RFID tag or the near field proximity transmitter device.

7. The system of claim 1, wherein the encoded artefact includes a sound tone, and wherein a microphone of the client device detects the sound tone.

8. The system of claim 7, wherein the sound tone includes a spoken audio tone.

9. The system of claim 1, wherein the communication interface further receives an acknowledgment that a payment has been processed at the webpage and sends a receipt to the system of the identified product provider based on the acknowledgement.

10. The system of claim 1, wherein the communication interface further receives a request to download an online application at the client device and provides the online application for download by the client device.

11. The system of claim 1, wherein the processors execute further instructions to automatically provide security data via a security device to the online webpage.

12. A method for secure communication of online data, the method comprising:

receiving encoded product data sent over a communication network from a client device that read a corresponding encoded artefact, the encoded product data including an encoded reference;

communicating with a database that stores a plurality of encoded references each associated with a product provider; and executing an agent application stored in memory, wherein the agent application executed to:

identify that the encoded reference matches one of the stored references in the database, wherein the matching stored reference corresponds to an identified product provider;

automatically access of an online webpage associated with an account of the identified product provider; and automatically populate one or more fields associated with the online webpage, wherein the fields are populated based on the encoded product data and stored information regarding the identified product provider without being provided to a system of the identified product provider.

13. The method of claim 12, further comprising sending a request for account data to the system associated with the identified product provider based on the matching stored reference.

14. The method of claim 12, further comprising generating the encoded artefact, and providing the encoded artefact to the system associated with the identified product provider.

15. The method of claim 12, wherein the encoded artefact includes a visible code, and wherein a reader of the client device reads the encoded product data from the visible code.

16. The method of claim 15, wherein a camera of the client device captures an image of the visible code, and wherein the reader reads the encoded product data from the captured image of the visible code.

17. The method of claim 12, wherein the encoded artefact includes a radio frequency identification (RFID) tag or a near field proximity transmitter device, wherein the client device receives the encoded artefact via a wireless connection with the RFID tag or the near field proximity transmitter device.

18. The method of claim 12, wherein the encoded artefact includes a sound tone, and wherein a microphone of the client device detects the sound tone.

19. The method of claim 18, wherein the sound tone includes a spoken audio tone.

20. The method of claim 12, further comprising receiving an acknowledgment that a payment has been processed at the webpage, and sending a receipt to the system of the identified product provider based on the acknowledgement.

21. The method of claim 12, further comprising receiving a request to download an online application at the client device, and providing the online application for download by the client device.

22. The method of claim 12, further comprising automatically providing security data via a security device to the online webpage.

23. A non-transitory computer-readable storage medium having stored therein a computer program comprising instructions executable to perform a method for secure communication of online data, the method comprising:

receiving encoded product data sent over a communication network from a client device that read a corresponding encoded artefact, the encoded product data including an encoded reference;

communicating with a database that stores a plurality of encoded references each associated with a product provider; and executing an agent application stored in memory, wherein the agent application executed to:

identify that the encoded reference matches one of the stored references in the database, wherein the matching stored reference corresponds to an identified product provider;

automatically access of an online webpage associated with an account of the identified product provider; and automatically populate one or more fields associated with the online webpage, wherein the fields are populated based on the encoded product data and stored information regarding the identified product provider without being provided to a system of the identified product provider.

* * * * *